(12) United States Patent
Rose

(10) Patent No.: US 6,973,782 B2
(45) Date of Patent: Dec. 13, 2005

(54) PRESSURIZED HYDRAULIC FLUID SYSTEM WITH REMOTE CHARGE PUMP

(75) Inventor: Kenric B. Rose, Howell, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/739,079

(22) Filed: Dec. 19, 2003

(65) Prior Publication Data

US 2005/0132701 A1    Jun. 23, 2005

(51) Int. Cl.$^7$ ............................................. F16D 31/02
(52) U.S. Cl. ........................................ 60/414; 60/419
(58) Field of Search ........................... 60/413, 414, 419

(56) References Cited

U.S. PATENT DOCUMENTS

| | | | |
|---|---|---|---|
| 2,440,980 A * | 5/1948 | Sheppard | ................ 184/6.3 |
| 3,543,516 A | 12/1970 | Treichel | |
| 3,659,419 A | 5/1972 | Ikeda | |
| 3,903,696 A | 9/1975 | Carman | |
| 4,077,211 A | 3/1978 | Fricke | |
| 4,098,083 A | 7/1978 | Carman | |
| 4,214,445 A | 7/1980 | Winsor et al. | |
| 4,227,587 A | 10/1980 | Carman | |
| 4,412,600 A | 11/1983 | Ito et al. | |
| 4,629,033 A * | 12/1986 | Moore et al. | ................ 184/6.3 |
| 4,693,080 A | 9/1987 | Van Hooff | |
| 4,899,850 A * | 2/1990 | Koller et al. | ................ 184/6.3 |
| 5,505,527 A | 4/1996 | Gray, Jr. et al. | |
| 5,579,868 A | 12/1996 | Pelto-Huikko | |
| 6,209,322 B1 | 4/2001 | Yoshida et al. | |
| 6,349,543 B1 * | 2/2002 | Lisniansky | .................. 60/414 |

FOREIGN PATENT DOCUMENTS

DE    44 03 618 A1    8/1995
JP    61 059057 A     3/1986

* cited by examiner

*Primary Examiner*—Thomas E. Lazo
(74) *Attorney, Agent, or Firm*—Berenato, White & Stavish

(57) ABSTRACT

A pressurized hydraulic fluid system includes a charge pump, a hydraulic motor drivingly coupled to the charge pump, and a main hydraulic unit adapted to function as a pump to drive the hydraulic motor. The charge pump is in fluid communication with the main hydraulic unit for maintaining a sufficient inlet pressure in the main hydraulic unit when it functions as the pump. The system further includes a hydraulic fluid reservoir in fluid communication with an inlet of the charge pump, a hydraulic accumulator in fluid communication with the main hydraulic unit, and a return flow passage fluidly connecting the main hydraulic unit with the hydraulic fluid reservoir for returning an excess flow of the hydraulic fluid generated by the charge pump to the hydraulic fluid reservoir.

28 Claims, 3 Drawing Sheets

PRESSURIZED HYDRAULIC FLUID SYSTEM WITH REMOTE CHARGE PUMP

BACKGROUND OF THE INVENTION

1. Field of the Invention

The present invention relates to pressurized hydraulic fluid systems in general and, more particularly, to a pressurized hydraulic fluid system including a main pump and a charge pump provided for maintaining a sufficient inlet head pressure in the main pump under all conditions.

2. Description of the Prior Art

Conventionally, pressurized hydraulic fluid systems of the prior art include a main hydraulic unit, such a pump or motor/pump, provided for various applications, such as driving hydraulic motors or actuators, or charging high-pressure hydraulic accumulators. Usually, the hydraulic pumps, particularly, but not limited to, high performance piston pumps, require a positive head pressure on an inlet (suction) side thereof on some operating conditions. Examples of such operating conditions include, however are not limited to, high-speed operations, when a high viscosity hydraulic fluid is employed, or cold weather operation. In many such applications a dedicated charge pump is used between a fluid reservoir and the high performance hydraulic pump to create and maintain the positive head pressure on the inlet side thereof. Typically, the charge pump is driven by a power source separate from the main pump and a prime mover driving the main, high performance hydraulic pump. Such an arrangement of the pressurized hydraulic fluid system presents many disadvantages including the fact that the charge pumps of the prior art having separate power source cannot compensate for variations in flow rates passing through the high performance hydraulic pumps. Moreover, in many applications, it is not possible to mount the power source in proximity to the reservoir mounted charge pump.

Accordingly, it is the intent of this invention to overcome these shortcomings of the prior art by allowing for a portion of the hydraulic power converted from the power source to be used to drive the "remote" charge pump.

SUMMARY OF THE INVENTION

A pressurized hydraulic fluid system in accordance with the preferred embodiment of the present invention includes a charge pump, a hydraulic motor drivingly coupled to the charge pump, and a main hydraulic unit adapted to function as a hydraulic pump. The main hydraulic unit is provided to drive the hydraulic motor when functioning as the hydraulic pump. The charge pump of the present invention is in fluid communication with the main hydraulic unit when the main hydraulic unit functions as the hydraulic pump for maintaining a sufficient inlet pressure in the main hydraulic unit functioning as the pump. Moreover, the charge pump flow is proportional to the main hydraulic unit flow and so the hydraulic fluid system of the present invention is prone to waste less power.

Preferably, the main hydraulic unit is a positive displacement, reversible hydraulic unit that functions both as the hydraulic pump and a hydraulic motor when reversed.

The pressurized hydraulic fluid system of the present invention includes an arrangement that ensures that the rotational torque from the hydraulic motor to the charge pump is transmitted only when the hydraulic motor is driven by the main hydraulic unit functioning as the pump.

Therefore, the present invention depicts a novel arrangement of the pressurized hydraulic fluid system comprising a main pump and a charge pump provided for maintaining a sufficient inlet pressure in the main pump when it functions as a pump, wherein the charge pump is driven by a hydraulic motor mechanically coupled to the charge pump and, in turn, driven by the main pump. The present invention provides a proportional charge flow to the main pump to compensate the flow rate through the main pump.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
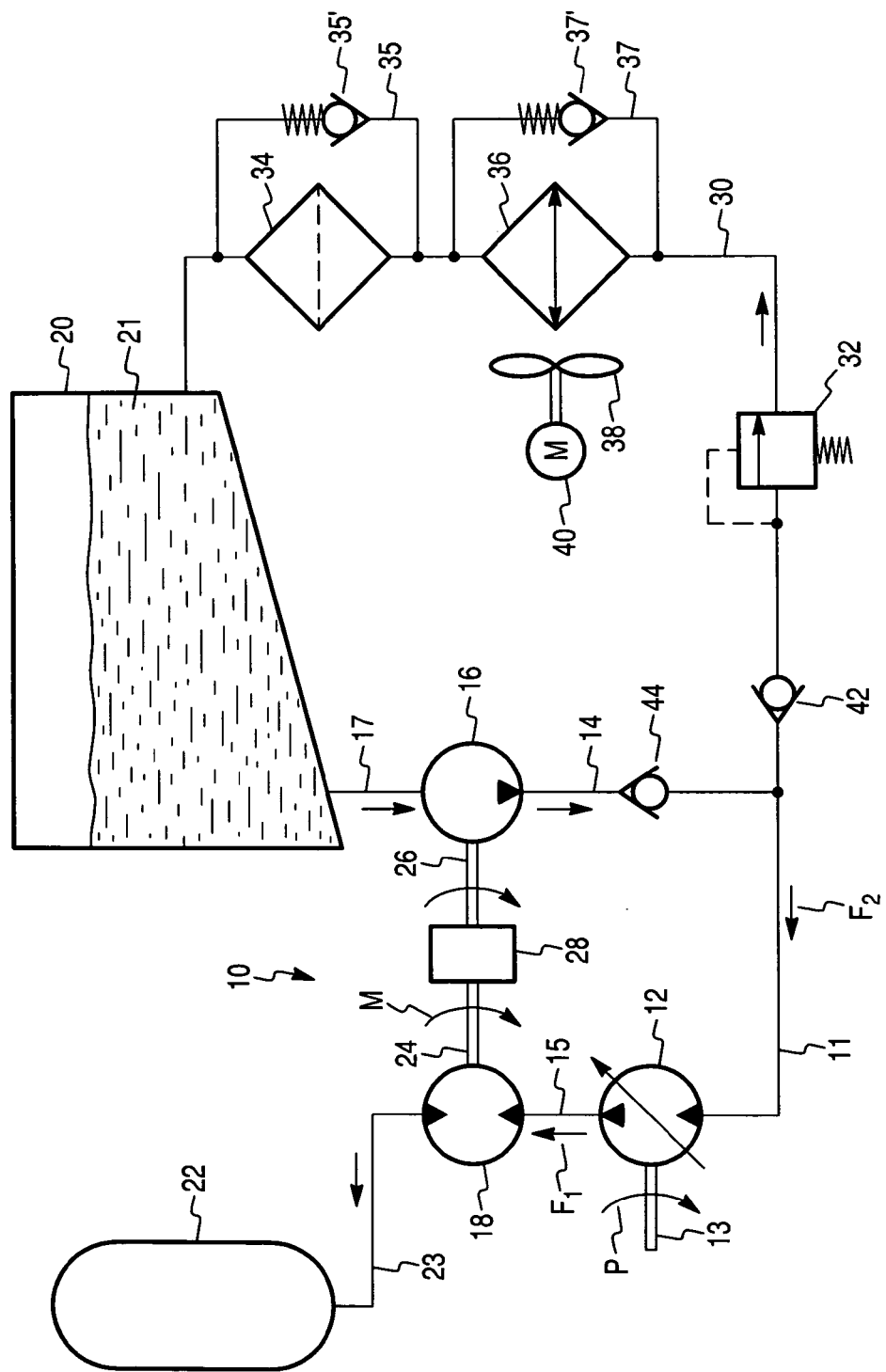
FIG. 1 is a schematic view of a pressurized hydraulic fluid supply system in accordance with the first exemplary embodiment of the present invention.

FIG. 1 schematically depicts a pressurized hydraulic fluid system 10 in accordance with the first exemplary embodiment of the present invention. The pressurized hydraulic fluid system 10 comprises a variable-displacement main hydraulic unit 12, a remote hydraulic fluid reservoir 20 hydraulically connected to the main hydraulic unit 12, and a high-pressure hydraulic accumulator 22 hydraulically connected to the main hydraulic unit 12. The hydraulic fluid reservoir 20 is provided for storing an appropriate amount of a hydraulic fluid 21 and supplying the hydraulic fluid 21 to the main hydraulic unit 12.

Preferably, the main hydraulic unit 12 is a positive displacement, reversible hydraulic unit, such as a high pressure piston motor/pump that functions both as hydraulic pump and hydraulic motor when reversed. More preferably, the main hydraulic unit 12 is a variable-displacement pump, such as a variable positive displacement motor/pump, e.g. a high pressure variable-displacement piston motor/pump. With this arrangement the displacement of the main hydraulic unit 12 may be varied and thus the flow produced can be controlled independent of speed at which it is driven. The benefit of the variable-displacement motor/pump is that the remote charge pump 16 not only self compensates for variations in the main unit speed, but also its displacement per revolution. However, it will be appreciated that any appropriate hydraulic motor/pump or pump unit is within the scope of the present invention.

In order to create and maintain a sufficient inlet head pressure in the main hydraulic unit 12 under all conditions, when the main hydraulic unit 12 functions a the hydraulic pump, the pressurized hydraulic fluid system 10 further includes a charge pump 16. Preferably, but not exclusively, the charge pump 16 is a non-positive displacement hydraulic pump, such as centrifugal pump, that allows for a variable charge pump flow based on the need of the main hydraulic unit 12 automatically. The use of the non-positive displacement charge pump would allow the main pump 12 to draw fluid through the charge pump 16 upon initial start-up. One of the deciding factors in consideration of the selection of positive or non-positive displacement charge pump is the working viscosity range of the employed hydraulic fluid. When the positive displacement charge pump is used, the overrun clutch 28 is relied upon to allow the charge pump to "freewheel" during initial startup. Due to the non-positive nature of the charge pump some inherent pressure regulation is possible. This is due to the fact that the flow of the centrifugal pump falls off rapidly with increasing pressure differential across the inlet and outlet ports of the pump. Alternatively, the charge pump 16 may be a positive displacement hydraulic pump used when speed and fluid conditions warrant.

The charge pump 16 receives the hydraulic fluid 21 from the hydraulic fluid reservoir 20 via an inlet hydraulic passage 17, and supplies the fluid 21 to the main hydraulic unit 12 via a main hydraulic passage 11 and an outlet hydraulic passage 14. As shown in FIG. 1, the outlet hydraulic passage 14 includes a check valve 44 allowing the fluid flow only in the direction from the charge pump 16. Preferably, the charge pump 16 is disposed adjacent to the reservoir 20. Further preferably, the charge pump 16 is mounted directly to the reservoir 20 in order to provide most favorable suction conditions when the viscosity of the hydraulic fluid is high. The reservoir 20 and the charge pump 16 could be located remote from the main hydraulic unit 12.

The charge pump 16 has a displacement enough to ensure that under all conditions sufficient amount of the hydraulic fluid 21 is supplied to the main hydraulic unit 12 when it functions a the hydraulic pump, in order to build a head pressure on a inlet thereof. Preferably, the charge pump 16 generates under all conditions larger amount of the hydraulic fluid 21 than the main hydraulic unit 12, working as the pump, is consuming. The excess flow of the hydraulic fluid 21 is returned to the remote reservoir 20 through a return flow passage 30 including a pressure relief valve 32, a particulate filter 34, a heat exchanger 36 and a check valve 42.

Furthermore, the return flow passage 30 includes a filter bypass line 35 for bypassing the particulate filter 34 in case of clogging thereof, and a heat exchanger bypass line 37 for bypassing the heat exchanger 36 in case of clogging thereof. In turn, the filter bypass line 35 is provided with a check valve 35', while the heat exchanger bypass line 37 is provided with a check valve 37'.

As further illustrated in FIG. 1, the pressurized hydraulic fluid supply system 10 further includes a cooling fan 38 associated with the heat exchanger 36 for forced cooling of the hydraulic fluid 21 flowing through the heat exchanger 36. The cooling fan 38 is selectively driven by an electric motor 40. One of ordinary skill in the art would appreciate that any other appropriate power source, besides the electric motor, may be employed to drive the cooling fan 38.

The charge pump 16 is driven by a positive displacement hydraulic motor 18 operatively coupled to the charge pump 16. More specifically, as illustrated in FIG. 1, an output shaft 24 of the hydraulic motor 18 is mechanically connectable to a drive shaft 26 of the charge pump 16 through a one-way clutch 28 arranged to transmit a rotational torque from the hydraulic motor 18 to the charge pump 16 only in one direction M, when the hydraulic motor 18 is driven by the main hydraulic unit 12 functioning as the pump. Obviously, when the hydraulic motor 18 rotates in the opposite direction, the rotational torque is not transmitted to the drive shaft 26 of the charge pump 16. Thus, the one-way clutch 28 is provided to prevent the reverse flow from the accumulator 22 from driving the charge pump 16 in reverse. This one-way clutch 28 allows for the hydraulic motor 18 to drive the charge pump 16 only in the direction that will produce flow from the charge pump 16 to the inlet port of the main hydraulic unit 12. Any reverse flow passing through the main hydraulic unit 12 returns to the reservoir 20 via the pressure relief valve 32. Reverse flow through the charge pump 16 is prevented by the one-way flow function of the check valve 44.

One-way overrunning clutches are well known in the art and are widely used in a variety of applications ranging from low speed devices such as bicycle drives to high speed mechanisms such as automotive transmissions and torque converters. Currently, commercial one-way clutches employed are generally of the sprag-type, the roller-ramp type, the ratchet-type, etc. It will be appreciated that any other appropriate types of one-way clutches between the hydraulic motor 18 and the charge pump 16 may also be employed, such as selectable one-way clutches which allow free-wheeling in both directions when the clutch is not actuated, but allowed to rotate only in one, overrun direction, when the clutch is actuated. One of ordinary skill in the art would understand that any appropriate types of clutches between the hydraulic motor 18 and the charge pump 16 may also be employed, such a friction clutch pack for selectively connecting the charge pump 16 to the hydraulic motor 18.

The hydraulic motor 18, in turn, is driven by the main hydraulic unit 12 when the main hydraulic unit 12 functions a the hydraulic pump. The hydraulic motor 18 and the main hydraulic unit 12 are hydraulically connected to each other via a hydraulic line 15. The hydraulic motor 18 is further hydraulically connected to the high-pressure hydraulic accumulator 22. Preferably, the accumulator 22 is a hydropneumatic accumulator well known in the art. However, any other appropriate types of hydraulic accumulators will also be within the scope of the present invention. One of ordinary skill in the art would understand that the purpose of the accumulator 22 is for recovering and storing, in the form of the hydraulic fluid under pressure, kinetic energy, such a kinetic energy of a vehicle during braking operation, which normally is dissipated as heat during deceleration. It will be appreciated that any appropriate hydraulic devices, such as hydraulic cylinders, hydraulic motors, pressure relief valves, etc. could be used instead of the accumulator 22.

The pressurized hydraulic fluid system 10, illustrated in FIG. 1, functions as follows. As an external source of the kinetic energy, such as a drivetrain of the vehicle, drives the main hydraulic unit 12 through a drive shaft 13 in the direction P, the main hydraulic unit 12 functions as the pump and generates the hydraulic pressure supplied to the hydraulic motor 18 through a hydraulic passage 15 in the direction $F_1$. Subsequently, the pressurized hydraulic fluid exiting the hydraulic motor 18 charges the pressure accumulator 22 through a hydraulic passage 23. At the same time, the hydraulic pressure generated by the main hydraulic unit 12 drives the hydraulic motor 18 in the direction M which, in turn, drives the charge pump 16 through the output shaft 24 and the drive shaft 26 coupled by the one-way clutch 28. The charge pump 16, subsequently, draws the hydraulic fluid 21 from the hydraulic fluid reservoir 20 via the inlet hydraulic passage 17, and supplies the pressurized hydraulic fluid to an inlet of the main hydraulic unit 12 via the hydraulic passages 11 and 14 in the direction $F_2$ as shown in FIG. 1. As it was disclosed hereinabove, the charge pump 16 generates a pressurized hydraulic fluid flow large enough to maintain the sufficient inlet head pressure in the main hydraulic unit 12 functioning as the pump under all conditions. The excess flow of the hydraulic fluid 21 from the charge pump 16 is returned to the remote reservoir 20 through the return flow passage 30. On its way to the reservoir 20, the excess flow of the hydraulic fluid passes through the heat exchanger 36 wherein the hydraulic fluid 21 is cooled, and through the particulate filter 34 for cleaning the hydraulic fluid 21 from impurities before entering the reservoir 20.

It will be appreciated by those skilled in the art that if the rotational speed of the drive shaft 13 of the main hydraulic unit 12, when functioning as the pump, increases, so does the rotational speed of the hydraulic motor 18 and, consequently, the charge pump 16. As a result, the amount of the hydraulic fluid 21 supplied to the main hydraulic unit 12 also increases. Therefore, the pressurized hydraulic fluid system 10 self-compensates for variations in flow rates through the main hydraulic unit 12, thus reducing an overall energy required to operate the system 10, and maintains sufficient head pressure on the inlet of the main hydraulic unit 12 under all conditions when it functions as the pump.

However, if the pressurized hydraulic fluid stored in the pressure accumulator 22 is employed to drive the main hydraulic unit 12, then the main hydraulic unit 12 functions as the motor and generates torque rotating the drive shaft 13. In this case, the pressurized hydraulic fluid from the pressure accumulator 22 is supplied to the main hydraulic unit 12 through the hydraulic passage 23, the hydraulic motor 18 and the hydraulic passage 15. It should be noted that although the output shaft 24 of the hydraulic motor 18 rotates, driven by the pressurized hydraulic fluid of the pressure accumulator 22, the charge pump 16 is inoperative due to the one-way clutch 28 which transmits the rotational torque from the hydraulic motor 18 to the charge pump 16 only in one direction, specifically when the hydraulic motor 18 is driven by the main hydraulic unit 12 functioning as the pump. The hydraulic fluid exiting the main hydraulic unit 12 through the main hydraulic passage 11 flows to the remote reservoir 20 through the return flow passage 30. Again, in its way to the reservoir 20, the flow of the hydraulic fluid passes through the heat exchanger 36 and through the particulate filter 34.

Figure 2:
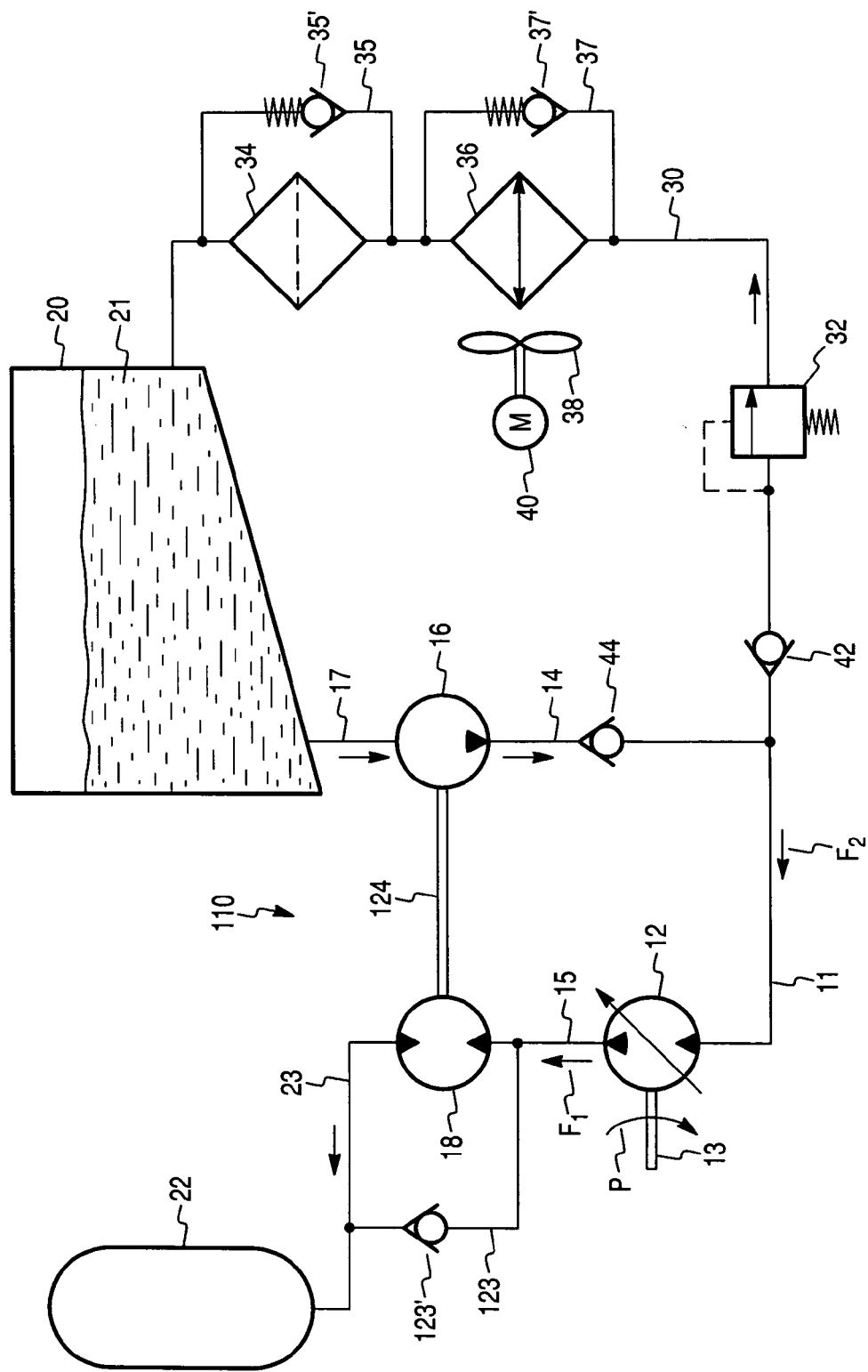
FIG. 2 is a schematic view of a pressurized hydraulic fluid supply system in accordance with the second exemplary embodiment of the present invention.

FIG. 2 shows a second exemplary embodiment of the pressurized hydraulic fluid system 110 in accordance with the present invention. Components that are unchanged from, or function in the same way as in the exemplary embodiment depicted in FIG. 1 are labeled with the same reference numerals.

More specifically, as illustrated in FIG. 2, the hydraulic motor 18 is directly mechanically coupled to the charge pump 16 through a drive shaft 124 arranged to transmit a rotational torque from the hydraulic motor 18 to the charge pump 16 only in one direction M, when the hydraulic motor 18 is driven by the main hydraulic unit 12 functioning as the pump (without the use of the one-way clutch).

Further, the pressurized hydraulic fluid system 110 of the second exemplary embodiment of the present invention comprises a motor bypass line 123 including a bypass check valve 123'. The motor bypass line 123 is provided for bypassing the hydraulic motor 18 when the main hydraulic unit 12, functioning as the hydraulic motor, is driven by the pressurized hydraulic fluid from the pressure accumulator 22. It should be noted that the motor bypass line 123 has less hydraulic resistance to the fluid flow than the hydraulic passage 23 so that the reverse flow from the pressure accumulator 22 is able to pass freely around the hydraulic motor 18 via the bypass check valve 123'. With little or no pressure differential across the ports of the hydraulic motor 18 it is not possible for the motor 18 to drive he charge pump 16.

The pressurized hydraulic fluid system 110, illustrated in FIG. 2, functions as follows. The operation of the hydraulic fluid system 110 is substantially identical to the operation of the hydraulic fluid system 10 when main hydraulic unit 12 functions as the pump driven by the external source of the kinetic energy, such as the drivetrain of the vehicle. In this situation, the motor bypass line 123 is blocked by the bypass check valve 123'. Consequently, all the fluid flow generated by the pump 12 is supplied to the hydraulic motor 18 through the hydraulic passage 15 in the direction $F_1$, thus driving the charge pump 16. Subsequently, the pressurized hydraulic fluid exiting the hydraulic motor 18 charges the pressure accumulator 22 through the hydraulic passage 23.

However, if the pressurized hydraulic fluid stored in the pressure accumulator 22 is employed to drive the main hydraulic unit 12, then the main hydraulic unit 12 functions as the motor and generates torque rotating the drive shaft 13. In this case, the pressurized hydraulic fluid from the pressure accumulator 22 is supplied to the main hydraulic unit 12 through the motor bypass line 123 and the hydraulic passage 15, thus bypassing the hydraulic motor 18. As the pressurized hydraulic fluid from the pressure accumulator 22 is not supplied to the hydraulic motor 18, the motor 18 does not drive the charge pump 16, thus rendering the charge pump 16 inoperative. Therefore, the particular arrangement of the hydraulic system 110 in accordance with the second embodiments of the present invention ensures that the rotational torque from the hydraulic motor 18 to the charge pump 16 is transmitted only when the hydraulic motor 18 is driven by the main hydraulic unit 12 functioning as the pump. The hydraulic fluid exiting the main hydraulic unit 12 through the main hydraulic passage 11 flows to the remote reservoir 20 through the return flow passage 30. Again, in its way to the reservoir 20, the flow of the hydraulic fluid passes through the heat exchanger 36 and through the particulate filter 34.

Figure 3:
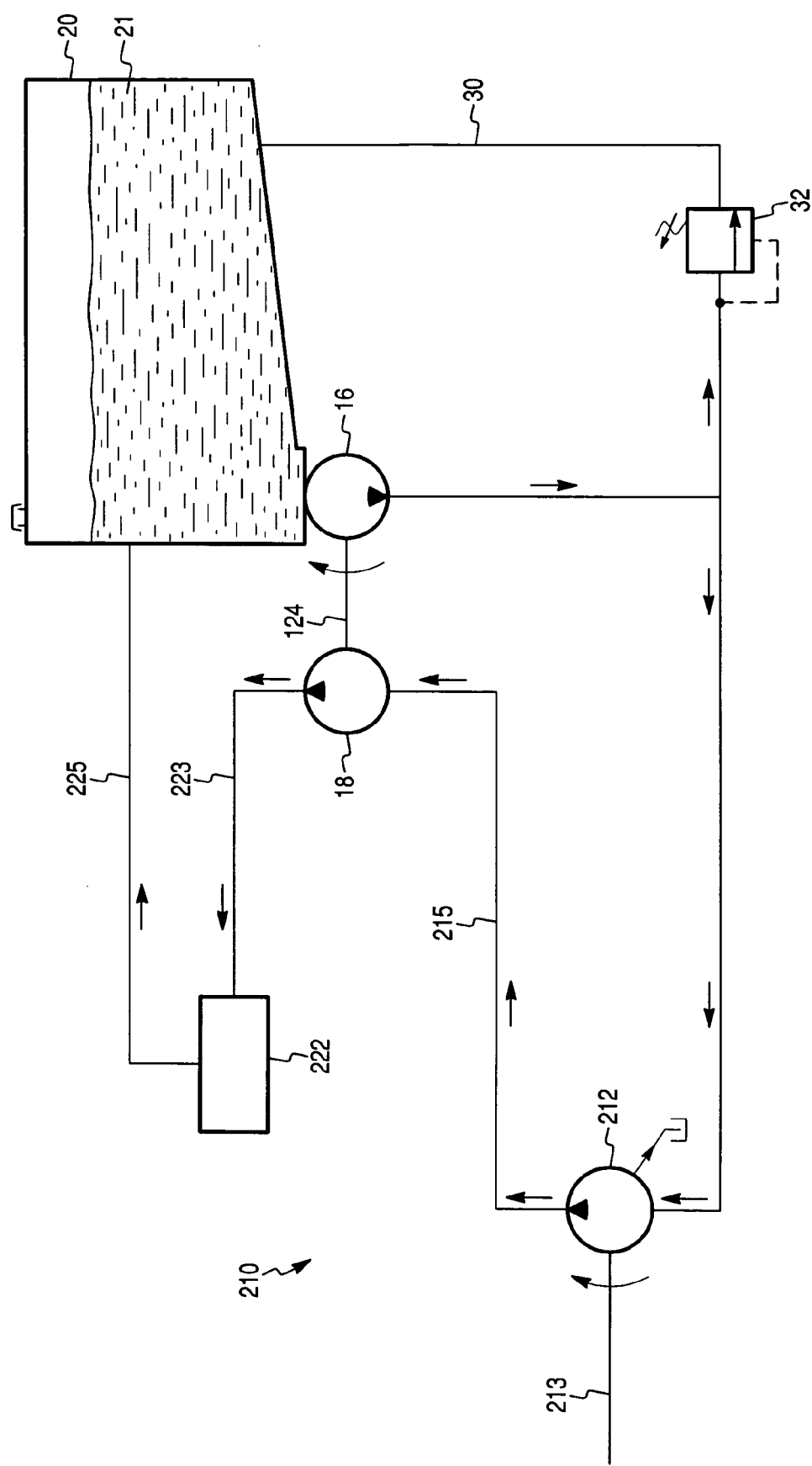
FIG. 3 is a schematic view of a pressurized hydraulic fluid supply system in accordance with the third exemplary embodiment of the present invention.

FIG. 3 shows a third exemplary embodiment of the pressurized hydraulic fluid system 210 in accordance with the present invention. Components that are unchanged from, or function in the same way as in the exemplary embodiment depicted in FIG. 2 are labeled with the same reference numerals.

More specifically, as illustrated in FIG. 3, the hydraulic motor 18 is directly mechanically coupled to the charge pump 16 through a drive shaft 124 arranged to transmit a rotational torque from the hydraulic motor 18 to the charge pump 16 only in one direction M, when the hydraulic motor 18 is driven by a main hydraulic pump 212 (without the use of the one-way clutch).

Preferably, the main hydraulic pump 212 is a variable, positive displacement pump, such as a high pressure piston pump. Alternatively, the main hydraulic pump 212 may be a fixed displacement pump, such as a positive displacement pump, e.g. a high pressure piston pump. It will be appreciated that any appropriate hydraulic pump is within the scope of the present invention. More preferably, the main pump 212 is a variable-displacement pump, such as a variable positive displacement pump, e.g. a high pressure variable-displacement piston pump. With this arrangement the displacement of the main pump 212 may be varied and thus the flow produced can be controlled independent of speed at which it is driven. The benefit of the variable-displacement pump is that the remote charge pump 16 not only self compensates for variations in the main unit speed, but also its displacement per revolution.

The hydraulic motor 18 is driven by the main hydraulic pump 212. The hydraulic motor 18 and the main hydraulic pump 212 are hydraulically connected to each other via a hydraulic line 215. The hydraulic motor 18 is further hydraulically connected to a hydraulic device 222 through a hydraulic passage 223. In turn, the hydraulic device 222 is hydraulically connected to the fluid reservoir 20 through a hydraulic passage 225. It will be appreciated that any appropriate types of hydraulic device may be employed in the hydraulic fluid system of the present invention, such as hydraulic accumulators, hydraulic cylinders, hydraulic motors, pressure relief valves, etc. Thus, the main hydraulic pump 212 is provided to drive any variety of hydraulic loads, such as the hydraulic cylinders and hydraulic motors, or charge the hydraulic accumulators.

In operation, as the main pump 212 is driven, suction is created on an inlet side thereof whilst an elevated pressure is created on an outlet side of the main pump 212. The pressure on the outlet side of the main pump 212 propels fluid into an inlet of the hydraulic motor 18. The hydraulic motor 18, in turn, drives the charge pump 16. The charge pump 16, in turn, pulls fluid 21 from the reservoir 20 and propels it to the suction side of the main pump 212. With a properly sized system the displacement per revolution of the charge pump 16 is greater than displacement per revolution of the motor 18. Thus, an excess of fluid flow is always available at a suction port of the main pump 212. To prevent over pressurization of the suction side of the main pump 212, a pressure relief valve 32 is used to regulate the maximum pressure. The flow generated by the charge pump 16 in excess of the flow drawn into the main pump 212 is discharged across the pressure relief valve 32 and returned the reservoir 20. As an option, various fluid-conditioning devices such as filters and/or heat exchangers (not shown in FIG. 3, but depicted in FIGS. 1 and 2), may be placed between the relief valve 32 and the reservoir 20.

One of ordinary skill in the art would understand that care must be taken in the sizing of the hydraulic motor and the charge pump relative to the flow performance of the main pump. It must be assured that the inlet pressure requirements are met under all potential operating conditions of the main pump. Particular care must be taken to prevent over speeding of the motor or charge pump. Also, care must be taken ensure that proper main pump inlet pressure conditions are met at the performance extremes of the main pump relative to speed and displacement. As an example, main pump inlet flow allowance must be made for the worst case where it is possible for some flow to exit the circuit without passing through the motor, such as any potential case drain flow as one example. It may be desirable to employ a pressure sensor immediately before the inlet port of the main pump to be monitored and used to prevent undesirable operating conditions.

Under some circumstances, there is little or no flow from the outlet port of the main pump but there is some flow into the inlet port. For example, when the variable displacement main pump in which the displacement is reduced so as to maintain a constant pressure at the outlet port is used, because of drain flow due to the internal clearances and lubrication requirements of the main pump there may be little or no flow from the outlet port. In this case the motor and therefore the charge pump would be idle. Care must be taken that, in the absence of an actively pumping charge pump, proper inlet pressure conditions are met.

This problem could be solved by using of the non-positive displacement charge pump, such as a centrifuigal type pump. Such a pump would allow for the free flow of fluid through it even when the pump is motionless. In such a case, with the generally reduced inlet flow of the main pump, the pressure at the inlet port of the main pump would be maintained at acceptable levels.

In case the positive displacement charge pump is employed, there could be a circumstance where the charge pump causes enough of a flow restriction that a proper main pump pressure condition may not be possible under all main pump flow conditions. In this case a one-way clutch may be used to allow for the free rotation of the charge pump as a motor relative to the motor in the line on the outlet port side of the main pump. Even so, with a design of this type, it should be taken into account that the frictional losses of the free wheeling charge pump, now functioning as a motor, does not cause a pressure drop across the charge pump such that the pressure at the inlet port of the main pump falls to unacceptable levels.

Therefore, the present invention embodies a novel arrangement of the pressurized hydraulic fluid system comprising a main hydraulic unit and a charge pump provided for maintaining a sufficient inlet pressure in the main hydraulic unit when it functions as a pump, wherein the charge pump is driven by a hydraulic motor mechanically coupled to the charge pump and, in turn, driven by the main hydraulic unit when it functions as the pump.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof; It is also intended that the scope of the present invention be defined by the claims appended thereto.

What is claimed is:

1. A pressurized hydraulic fluid system comprising:
   a charge pump;
   a hydraulic motor drivingly coupled to said charge pump;
   a main pump provided for driving said hydraulic motor; and
   a hydraulic device in fluid communication with both said main pump and said hydraulic motor;
   said charge pump being in fluid communication with said main pump for maintaining a sufficient inlet pressure in said main pump.

2. The pressurized hydraulic fluid system as defined in claim 1, further comprising a hydraulic fluid reservoir provided for storing an appropriate amount of a hydraulic fluid, said hydraulic fluid reservoir is in fluid communication with an inlet of said charge pump.

3. The pressurized hydraulic fluid system as defined in claim 2, further including a return flow passage fluidly connecting said main pump with said hydraulic fluid reservoir for returning an excess flow of said hydraulic fluid generated by said charge pump to said hydraulic fluid reservoir.

4. The pressurized hydraulic fluid system as defined in claim 3, wherein said return flow passage includes a check valve.

5. The pressurized hydraulic fluid system as defined in claim 3, wherein said return flow passage includes a particulate filter.

6. The pressurized hydraulic fluid system as defined in claim 5, wherein said return flow passage includes a filter bypass line for bypassing said particulate filter in case of clogging thereof.

7. The pressurized hydraulic fluid system as defined in claim 3, wherein said return flow passage includes a heat exchanger.

8. The pressurized hydraulic fluid system as defined in claim 7, wherein said return flow passage includes a heat exchanger bypass line for bypassing said heat exchanger in case of clogging thereof.

9. The pressurized hydraulic fluid system as defined in claim 7, further including a cooling fan associated with said heat exchanger for forced cooling of said hydraulic fluid flowing through said heat exchanger.

10. The pressurized hydraulic fluid system as defined in claim 9, wherein said cooling fan is driven by an electric motor.

11. The pressurized hydraulic fluid system as defined in claim 2, wherein said charge pump is mounted directly to said hydraulic fluid reservoir.

12. The pressurized hydraulic fluid system as defined in claim 2, wherein said main pump is a reversible hydraulic unit that is capable to function both as a hydraulic pump and a hydraulic motor, said system further including a return flow passage fluidly connecting said hydraulic unit with said reservoir for returning an excess flow of said hydraulic fluid generated by said charge pump to said reservoir when said hydraulic unit functions as the pump and for delivering said hydraulic fluid exiting said hydraulic unit to said reservoir when said hydraulic unit functions as the motor.

13. The pressurized hydraulic fluid system as defined in claim 1, further comprising a hydraulic conduit connecting an outlet of said charge pump with an inlet of said main pump for providing said fluid communication between said charge pump and said main pump.

14. The pressurized hydraulic fluid system as defined in claim 1, wherein said hydraulic motor is drivingly coupled to said charge pump through a one-way clutch provided to transmit a rotational torque from said hydraulic motor to said charge pump only when said hydraulic motor is driven by said main pump.

15. The pressurized hydraulic fluid system as defined in claim 1, wherein said charge pump is a non-positive displacement hydraulic pump.

16. The pressurized hydraulic fluid system as defined in claim 15, wherein said charge pump is a centrifugal pump.

17. The pressurized hydraulic fluid system as defined in claim 1, wherein said hydraulic device is one of a hydraulic accumulator, a hydraulic cylinder and a hydraulic motor.

18. A pressurized hydraulic fluid system comprising:
a charge pump;
a hydraulic motor drivingly coupled to said charge pump;
a main pump provided for driving said hydraulic motor;
a hydraulic fluid reservoir provided for storing an appropriate amount of a hydraulic fluid, said hydraulic fluid reservoir is in fluid communication with an inlet of said charge pump; and
a return flow passage fluidly connecting said main pump with said hydraulic fluid reservoir for returning an excess flow of said hydraulic fluid generated by said charge pump to said hydraulic fluid reservoir;
said charge pump being in fluid communication with said main pump for maintaining a sufficient inlet pressure in said main pump;
said return flow passage includes a pressure relief valve.

19. A pressurized hydraulic fluid system comprising:
a charge pump;
a hydraulic motor drivingly coupled to said charge pump; and
a main pump provided for driving said hydraulic motor, said main pump being a variable-displacement piston pump;
said charge pump being in fluid communication with said main pump for maintaining a sufficient inlet pressure in said main pump.

20. A pressurized hydraulic fluid system comprising:
a charge pump;
a hydraulic motor drivingly coupled to said charge pump; and
a main pump provided for driving said hydraulic motor, said main pump being a reversible main hydraulic unit that is capable to function both as a hydraulic pump and a hydraulic motor;
said charge pump being in fluid communication with said main pump for maintaining a sufficient inlet pressure in said main pump.

21. The pressurized hydraulic fluid system as defined in claim 20, further comprising a hydraulic accumulator in fluid communication with both said main hydraulic unit and said hydraulic motor, said accumulator provided for storing a pressurized hydraulic fluid adapted to drive said main hydraulic unit when said main hydraulic unit functions as the motor.

22. The pressurized hydraulic fluid system as defined in claim 21, further including a motor bypass line provided for bypassing said hydraulic motor in order to render said hydraulic motor inoperative when said main hydraulic unit functions as the motor driven by said pressurized hydraulic fluid from said accumulator.

23. The pressurized hydraulic fluid system as defined in claim 21, wherein said hydraulic accumulator is a hydro-pneumatic accumulator.

24. The pressurized hydraulic fluid system as defined in claim 20, further comprising a hydraulic device in fluid communication with both said main hydraulic unit and said hydraulic motor.

25. The pressurized hydraulic fluid system as defined in claim 24, wherein said hydraulic device is one of a hydraulic accumulator, a hydraulic cylinder and a hydraulic motor.

26. A pressurized hydraulic fluid system comprising:
a non-positive displacement charge pump;
a hydraulic motor drivingly coupled to said charge pump through a one-way clutch;
a main hydraulic unit provided for driving said hydraulic motor, said charge pump being in fluid communication with said main hydraulic unit for maintaining a sufficient inlet pressure in said main hydraulic unit when said main hydraulic unit functions as the pump;
said one-way clutch provided to transmit a rotational torque from said hydraulic motor to said charge pump only when said hydraulic motor is driven by said main hydraulic unit functioning as the pump;
a hydraulic fluid reservoir provided for storing an appropriate amount of a hydraulic fluid, said hydraulic fluid reservoir being in fluid communication with an inlet of said charge pump;

a hydraulic accumulator in fluid communication with said hydraulic motor; and a return flow passage fluidly connecting said main hydraulic unit with said reservoir for returning an excess flow of said hydraulic fluid generated by said charge pump to said reservoir when said main hydraulic unit function as the pump and for delivering said hydraulic fluid exiting said main hydraulic unit to said reservoir when said main hydraulic unit function as the motor, wherein said return flow passage includes a pressure relief valve, a check valve, a particulate filter, a heat exchanger and an electric motor driven cooling fan associated with said heat exchanger for forced cooling of said hydraulic fluid flowing through said heat exchanger.

27. A pressurized hydraulic fluid system comprising:

a non-positive displacement charge pump;

a hydraulic motor directly coupled to said charge pump;

a main hydraulic unit provided for driving said hydraulic motor, said charge pump being in fluid communication with said main hydraulic unit for maintaining a sufficient inlet pressure in said main hydraulic unit when said main hydraulic unit functions as the pump;

a hydraulic accumulator in fluid communication with said hydraulic motor, said accumulator provided for storing a pressurized hydraulic fluid adapted to drive said hydraulic unit when said hydraulic unit functions as the motor;

a motor bypass line provided for bypassing said hydraulic motor in order to render said hydraulic motor inoperative when said hydraulic unit functions as the motor driven by said pressurized hydraulic fluid from said accumulator;

a hydraulic fluid reservoir provided for storing an appropriate amount of a hydraulic fluid, said hydraulic fluid reservoir being in fluid communication with an inlet of said charge pump; and a return flow passage fluidly connecting said main hydraulic unit with said reservoir for returning an excess flow of said hydraulic fluid generated by said charge pump to said reservoir when said main hydraulic unit function as the pump and for delivering said hydraulic fluid exiting said main hydraulic unit to said reservoir when said main hydraulic unit function as the motor, wherein said return flow passage includes a pressure relief valve, a check valve, a particulate filter, a heat exchanger and an electric motor driven cooling fan associated with said heat exchanger for forced cooling of said hydraulic fluid flowing through said heat exchanger.

28. A pressurized hydraulic fluid system comprising:

a non-positive displacement charge pump;

a hydraulic motor drivingly connected to said charge pump;

a variable positive displacement main pump provided for driving said hydraulic motor, said charge pump being in fluid communication with said main pump for maintaining a sufficient inlet pressure therein;

a hydraulic fluid reservoir provided for storing an appropriate amount of a hydraulic fluid, said hydraulic fluid reservoir being in fluid communication with an inlet of said charge pump;

a hydraulic device in fluid communication with said hydraulic motor; and a return flow passage fluidly connecting said main pump with said reservoir for returning an excess flow of said hydraulic fluid generated by said charge pump to said reservoir, wherein said return flow passage includes a pressure relief valve.

* * * * *